United States Patent Office 3,260,838
Patented July 12, 1966

3,260,838
DEVIATION CONTROL SYSTEM
Wilmer C. Anderson, Greenwich, Conn., assignor to General Time Corporation, New York, N.Y., a corporation of Delaware
Filed Jan. 22, 1963, Ser. No. 253,195
6 Claims. (Cl. 235—92)

The present invention relates to a deviation control system and more specifically to a system for detecting an abnormal number of out-of-tolerance final products being produced in a manufacturing process or the like and for making a corrective change in the product parameters.

Frequently, in the operation of automatic machinery or processes, a slow drift occurs in the machine or process controls. Large production runs may be made before quality control personnel can detect that an abnormal number of out-of-tolerance final products are being produced and take steps to correct the controlling parameters. Therefore, in many such operations, it is desirable to provide means for statistically sampling final products produced in the operation and for automatically correcting the parameters of the operation upon detection of an abnormal number of out-of-tolerance final products.

An object of this invention is to provide a deviation control system for statistically sampling the products of a manufacturing process or the like and for automatically correcting the parameters of the process if an abnormal number of out-of-tolerance final products are noted.

Another object of this invention is to provide a deviation control system for controlling a variable in a manufacturing process or the like to minimize the number of out-of-tolerance final products produced during such process. An additional object of this invention is to provide a deviation control system for controlling a plurality of variables in a manufacturing process or the like to minimize the number of out-of-tolerance final products produced during such process.

A further object of this invention is to provide a deviation control system, having its operation based upon the determination of the statistical distribution of one or more parameters of a final product to be produced, for controlling variables in a manufacturing process or the like when an abnormal number of out-of-tolerance products are produced.

Still another object of this invention is to provide a deviation control system having stable characteristics, which is not upset by random signals from extremely short-term fluctuations and system "noise," and having a control accuracy of approximately 0.1%.

A still further and more detailed object of this invention is to provide a deviation control system which includes a counter circuit for adjusting the parameters of an operation when a prescribed number of out-of-tolerance final products are detected and a counter circuit for resetting the deviation control system if a predetermined number of final products are produced without the prescribed number of out-of-tolerance final products being detected.

A general object of this invention is to provide a deviation control system which is more stable, more accurate, more compact and more economical than presently available systems of this type.

Other objects and advantages of this invention will become apparent upon reading the attached detailed description and upon reference to the drawings, in which:

FIG. 2 shows typical statistical distribution curves of deviations from a norm for products produced in a manufacturing process or the like;

While the invention has been described in connection with a preferred embodiment, it will be apparent to one skilled in the art that the invention is not limited to the particular embodiment but, on the contrary, it is intended to cover the alternative and equivalent arrangements included within the spirit and scope of the appended claims.

In the drawings, flip-flops, AND gates and OR gates have been symbolically illustrated since these circuit elements are commonly used in the electronics art. However, a brief description of their operation may be helpful in understanding the operation of the Deviation Control System.

The flip-flops are illustrated as rectangles having two sections, one being marked "S" and the other being marked "R." Input terminals are attached to the left-hand side of the flip-flops as illustrated and output terminals are attached to the right-hand side thereof. When an input signal or pulse is applied to the "S" input terminal, the flip-flop is "set" and a desired output signal is provided at the "S" output terminal only. When an input signal or pulse is applied to the "R" input terminal, the flip-flop is "reset" and a desired output signal is provided at the "R" output terminal only.

The OR gates are such that an output signal is provided thereby when an input signal is applied to any input terminal and the AND gates are such that an output is provided thereby only when input signals are applied to all input terminals. For the purposes of this invention, the term "open" is utilized to indicate when an AND gate is rendered conductive and the term "closed" is utilized to indicate when an AND gate is rendered nonconductive.

Figure 1:
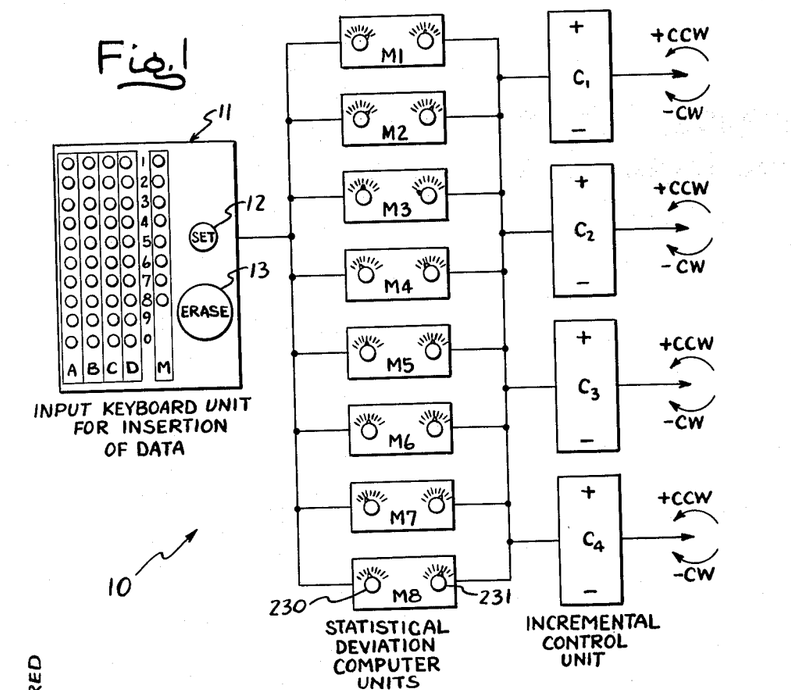
FIGURE 1 is a block diagram of a deviation control system constructed in accordance with the present invention.

Referring now to the drawings and more specifically to FIG. 1, a deviation control system 10 is illustrated for detecting an abnormal number of out-of-tolerance products being produced in a manufacturing process or the like and for making a corrective change in the process parameters causing the abnormality. The deviation control system includes an input keyboard 11 whereon the measurement of desired parameters of a product may be entered. The input keyboard unit has four rows of ten selector buttons, designated as rows A–D, which may be depressed in accordance with the four most significant digits of the value of a measured parameter and has a fifth row of eight selector buttons, designated as row M, which may be depressed to select one of eight computer units M1–M8 to which the value of the measured parameter is transmitted. In the illustrated embodiment, row A of the selector buttons is for the unit's digit, row B is for the ten's digit, row C is for the hundred's digit and row D is for the thousand's digit. The keyboard unit also includes a set button 12 for causing the measured value entered on the keyboard to be transmitted to the selected computer unit when depressed and includes an erase button 13 for causing the keyboard to be cleared when depressed.

The computer units M1–M8 are provided to detect an abnormal number of out-of-tolerance products and to control the direction of operation of control units C1–C4 such that the control units are caused to operate in a clockwise direction or a counterclockwise direction. The control units in turn control the setting of the process parameters.

Briefly stated, the operation of the deviation control system is such that when (1) the value of a measured product parameter is entered on the keyboard by depressing selected ones of the selector buttons in rows A–D, (2) a computer unit is selected by depressing one of the buttons in row M, and (3) the set button 12 is depressed, the value entered on the keyboard is transmitted to the selected one of the computer units M1–M8. When an abnormal number of values indicative of out-of-tolerance parameters have been transmitted to the selected computer unit, the computer unit causes the control units C1–C4 to operate in a clockwise or counterclockwise direction depending on whether the abnormal number of values is below or above acceptable tolerance limits. If a predetermined number of products have been measured without an abnormal number of out-of-tolerance products being detected, the deviation control system is reset to an initial condition.

Though the control units C1–C4 have been illustrated as connected to all of the computer units M1–M8, it will be obvious to one skilled in the art that separate control units or a single control unit may be independently associated with each of the computer units M1–M8 without departing from the spirit and scope of the invention. Additionally, though the deviation control system has been described with the measured product value being manually entered on the keyboard unit 11, it will be obvious to one skilled in the art that the measuring of a product and the entering of the measured value on the keyboard unit 11 could be automatically accomplished by mechanical and/or electrical means.

Figure 2:
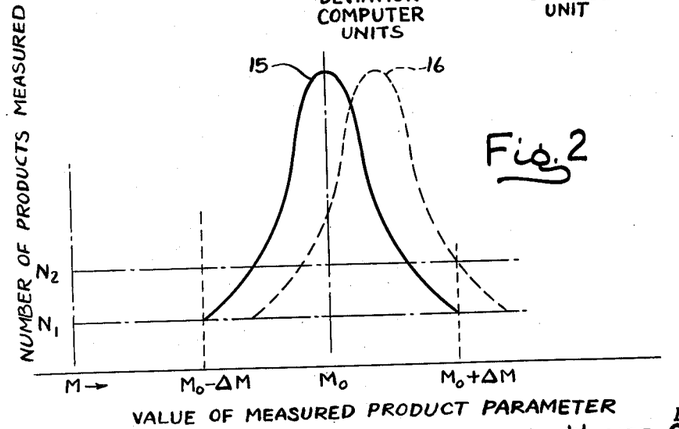

Typical statistical distribution curves for a manufacturing process or the like are illustrated in FIG. 2 wherein $M_0$ indicates the desired value of a measured parameter, $M_0 - \Delta M$ indicates the lower allowable tolerance limit for a measured parameter, $M_0 + \Delta M$ indicates the higher allowable tolerance limit for a measured parameter, $N_1$ indicates the maximum allowable number of out-of-tolerance values for a predetermined number of products, and $N_2$ indicates an abnormal number of out-of-tolerance values. Solid curve 15 depicts an acceptable distribution curve for a predetermined number of measured products in that the number of products having parameters which exceed the allowable tolerances is only $N_1$. Dotted curve 16 depicts an abnormal distribution curve for a predetermined number of measured products in that $N_2$ products have parameters which exceed the upper tolerance limit $M_0 + \Delta M$ and $N_2$ is greater than $N_1$. If a distribution curve follows the solid curve 15, the control units C1–C4 will not be operated and, if a distribution curve follows the dotted curve 16, the control units C1–C4 will be operated in the counterclockwise direction.

Figure 3:
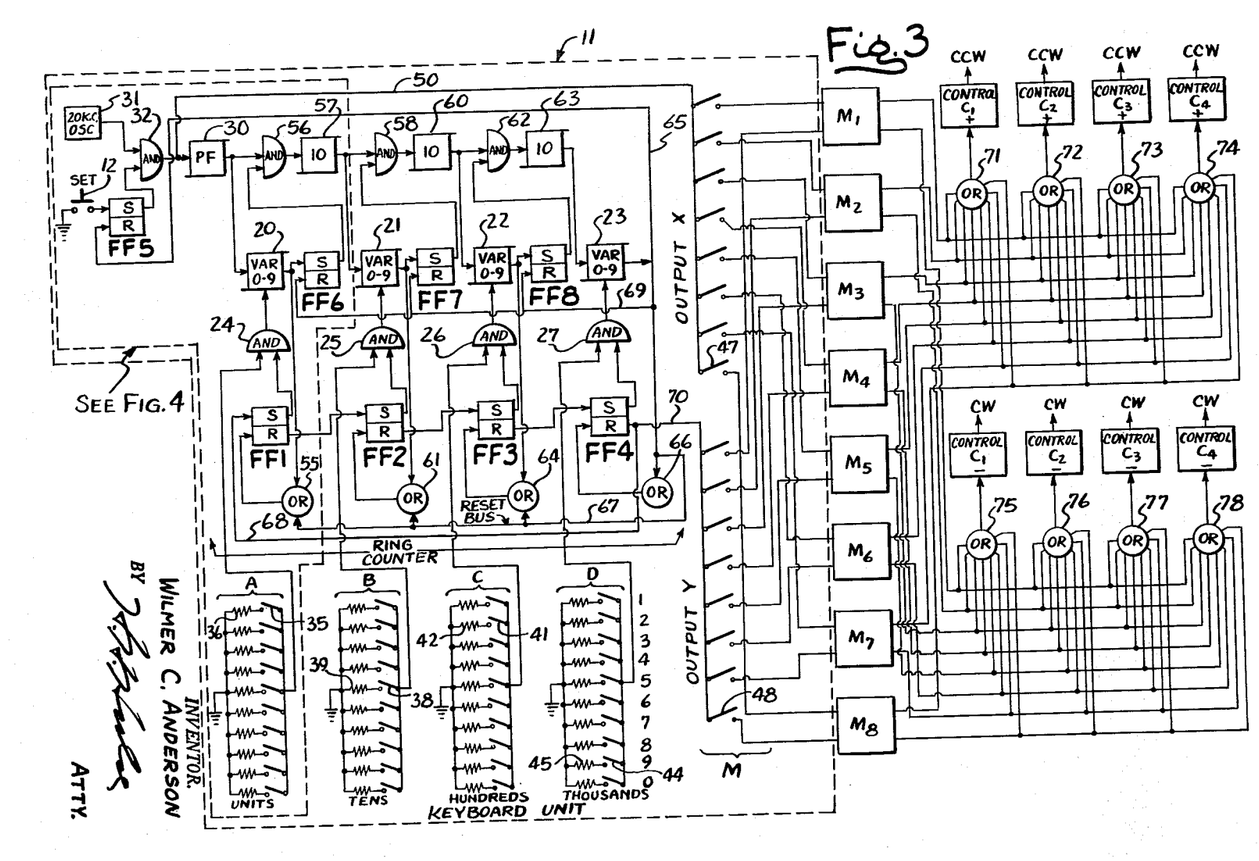
FIG. 3 is a more detailed block diagram of the deviation control system illustrated in FIG. 1.

Referring to FIG. 3, the keyboard unit 11 is illustrated in more detailed block form. The keyboard unit 11 is designed to provide a train of output pulses at output X which includes pulses equal in number to the value entered on the keyboard by depressing selected ones of the selector buttons in rows A–D and to provide a reference output pulse at output Y which is indicative of the end of the train of output pulses at output X. For accomplishing this purpose, the keyboard unit includes a source of pulses for providing a train of input pulses, a ring counter having four stages A–D, which correspond to the four rows of selector buttons A–D for providing a reference output pulse when a desired number of input pulses have been counted, and four settable resistor-switch banks A–D corresponding to the four rows of selector buttons A–D for setting the ring counter to count a predetermined number of input pulses.

Each of the resistor-switch banks A–D includes ten resistor-switch combinations connected in parallel and each switch corresponds to a selector button in the associated one of the selector button rows A–D. When a selector button is depressed, the associated switch is closed to connect the associated resistor to the associated stage of the ring counter.

The ring counter includes four variable "0–9" counters 20–23 having inputs and outputs which provide output pulses when filled. The input of each variable "0–9" counter is connected through one of four AND gates 24–27 to the associated resistor-switch bank A–D so that the counter input is shunted by a selected resistor when the associated one of the AND gates 24–27 is opened and a selector button in the associaed selector button row A–D is closed. The counters are so designed that the number of pulses, between 1 and 10 required to fill the counter is dependent upon the value of resistance shunting the input thereof. Thus, the count required to fill a variable "0–9" counter is dependent upon the resistance from the associated resistor-switch bank shunting the counter input, which in turn is dependent upon which selector button associated with the resistor-switch bank has been depressed.

The AND gates 24–27 are controlled by the operation of associated flip-flops FF1–FF4. When the flip-flops FF1–FF4 are driven to the set conditions, the AND gates 24–27 are opened and, when the flip-flops FF1–FF4 are driven to reset conditions, the AND gates 24–27 are closed. At the completion of a counting operation by the ring counter, the flip-flops FF1–FF4 are driven to the reset conditions. When a flip-flop is driven to the reset condition, it causes the next succeeding flip-flop to be driven to the set condition so that subsequent to the flip-flops FF1–FF4 being reset, they are set and the AND gates 24–27 are opened.

A pulse former 30 is provided for supplying input pulses to the ring counter which have a predetermined volt-second content. The pulse former 30 is connected to a source of input pulses 31, illustrated as a 20-kc. oscillator, through an AND gate 32 and provides an output pulse having a predetermined volt-second content for each input pulse applied thereto. The AND gate 32 is opened to permit transmission of pulses from the source 31 to the pulse former 30 when a flip-flop FF5 is driven to the set condition, and the flip-flop FF5 is driven to the set condition when the keyboard unit set button 12 is depressed. The pulse former 30 is connected directly to the variable "0–9" counter 20 and is connected to the other variable "0–9" counters 21–23 through a series of "10" counters and AND gates.

The operation of the keyboard unit 11 is as follows. Assume the value 9,251 is entered on the keyboard unit by depressing selected ones of the selector buttons in rows A–D, and assume selector button 8 in row M is depressed to select computer unit M8. Switch 35 in resistor-switch bank A is closed connecting resistor 36 to stage A of the ring counter; switch 38 in the resistor-switch bank B is closed connecting resistor 39 to stage B of the ring counter; switch 41 of the resistor-switch bank C is closed connecting resistor 42 to stage C of the counter; switch 44 of the resistor-switch bank D is closed connecting resistor 45 to stage D of the ring counter; switch 47 in output X is closed connecting output X to the computer unit M8; and switch 48 in output Y is closed connecting output Y to the computer unit M8. When the set button 12 is depressed, an input signal is applied to the "S" input terminal of the flip-flop FF5 causing the flip-flop FF5 to be driven to the set condition so that AND gate 32 is opened and pulses are transmitted from the source of pulses 31 to the pulse former 30 through AND gate 32. The pulses from the source of pulses 31 passing through AND gate 32 are also transmitted to output X over conductor 50 and are transmitted through the closed switch 47 to the computer unit M8.

Pulses from the pulse former 30 are transmitted to the input of the variable "0–9" counter 20 which is filled in response to the first pulse since it was preset to count only one pulse by the closing of switch 35 in the resistor-switch bank A. When the variable "0–9" counter 20 is filled, an output pulse is provided thereby which is transmitted to the "S" input terminal of a flip-flop FF6 and to an OR gate 55. The flip-flop FF6 is driven to the set condition by the output pulse from the "0–9" counter 20 and an output signal is provided at the "S" output terminal which is transmitted to an AND gate 56 and causes the AND gate 56 to be opened so that subsequent pulses from the pulse former 30 are transmitted through the AND gate 56 to the input of a "10" counter 57. The output from the "0–9" counter 20 passes through the OR gate 55 and is applied to the "R" input terminal of the flip-flop FF1, causing the flip-flop FF1 to be reset so that the AND gate 24 is closed since the "S" output terminal is connected thereto, and an output signal is provided at the "R'" output terminal which is transmitted to the "S"' input terminal of the next succeeding flip-flop FF2. Flip-Flop FF2 is maintained in the set condition and an output signal is maintained at the "S" output terminal which is transmitted to the AND gate 25. The AND gate 25 is maintained opened and the resistor-switch bank B is still connected to the input of the variable "0–9" counter 21.

When ten pulses have been applied to the input of the "10" counter 57 from the pulse former 30, the "10" counter 57 is filled and an output pulse is provided thereby which is transmitted to the input of the variable "0–9" counter 21. Since switch 38 of the resistor-switch bank B has been closed to shunt the input of "0–9" counter 21 with the resistor 39, "0–9" counter 21 is filled when five pulses have been applied thereto from the "10" counter 57 which corresponds to fifty pulses provided by the pulse former 30 since the counter 57 is a "10" counter requiring ten input pulses to be filled. Similar to the operation of the counter 20, when the "0–9" counter 21 is filled, an output pulse is provided thereby which causes flip-flop FF7 to be set so that AND gate 58 is opened and subsequent output pulses from the "10" counter 57 are transmitted through the AND gate 58 to a "10" counter 60. The output pulse from the "0–9" counter 21 is also transmitted through an OR gate 61 to cause resetting of flip-flop FF2 and to cause the maintaining of flip-flop FF3 in the set condition.

An output pulse is provided by the "10" counter 60 in response to every one hundred pulses provided by the pulse former 30 since the input thereto is provided by the "10" counter 57. Since the variable "0–9" counter 22 is set to be filled by two pulses from the "10" counter 60 due to the closing of switch 41 in the resistor-switch bank C, two hundred pulses must be provided by the pulse former 30 to cause the "0–9" counter 22 to be filled. When the "0–9" counter 22 is filled, an output pulse is provided thereby which causes flip-flop FF8 to be set so that AND gate 62 is opened and subsequent output pulses from the "10" counter 60 are transmitted through the AND gate 62 to a "10" counter 63. The output pulse from the "0–9" counter 22 is also transmitted through an OR gate 64 to cause resetting of flip-flop FF3 and to cause the maintaining of flip-flop FF4 in the set condition.

An output pulse is provided by the "10" counter 63 when one thousand pulses have been provided by the pulse former 30 since it is dependent on the operation of both "10" counters 60 and 57. Since the variable "0–9" counter 23 has been preset to be filled by nine input pulses from the "10" counter 63 due to the closing of switch 44 in the resistor-switch bank D, nine thousand pulses must be provided by the pulse former 30 to cause the "0–9" counter 23 to be filled and to cause an output pulse to be provided by the "0–9" counter 23. The output pulse from the "0–9" counter 23 is transmitted over conductor 65 to the reset input of the flip-flop FF5 and causes the flip-flop FF5 to be reset so that the AND gate 32 is closed and no further pulses are transmitted from the source of pulses 31 to the pulse former 30 or to the output X. The output pulse from the "0–9" counter 23 is also transmitted through an OR gate 66 to cause resetting of the flip-flop FF4 and through a reset bus 67 to the OR gates 55, 61 and 64 to cause resetting of the flip-flops FF1–FF3. Additionally, the output pulse from the "0–9" counter 23 is transmitted over conductor 69 to the "R" input terminals of the flip-flops FF6–FF8 to cause the flip-flops FF6–FF8 to be reset.

When the flip-flop FF4 is reset, an output signal is provided at the "R" output terminal thereof which is transmitted over conductor 68 to the "S" input terminal of flip-flop FF1 so that flip-flop FF1 is driven to the set condition and, when flip-flops FF1–FF3 are reset, output signals are provided at the "R" output terminals thereof which are transmitted to the "S" input terminals of the flip-flops FF2–FF4 so that flip-flops FF2–FF4 are driven to the set conditions. Thus, the ring counter is conditioned for a subsequent cycle of operation. An output pulse from the "R" output terminal of flip-flop FF4 is also transmitted over conductor 70 to output Y and is transmitted as a reference pulse therefrom through the closed switch 48 to the computer unit M8.

Thus, by totaling the number of pulses required to fill all the variable "0–9" counters 20–23, it may be seen that 9,251 pulses were provided by the source of pulses 31 before the AND gate 32 was caused to be closed by the output pulse from the "0–9" counter 23, the 9,251 pulses being transmitted to the computer unit M8 through output X. Also, it may be seen that a reference output pulse is applied to output Y from the flip-flop FF4 after the 9,251 pulses were transmitted to output X which reference pulse is indicative of the completion of the transmission of a train of pulses to output X.

In FIG. 3, each of the control units C1–C4 is illustrated as two control units, one for counterclockwise control and the other for clockwise control. Additionally, each of the control units is connected to the output of all the computing units M1–M8 through OR gates 71–78 rather than being directly connected thereto, as illustrated in FIG. 1.

Figure 4:
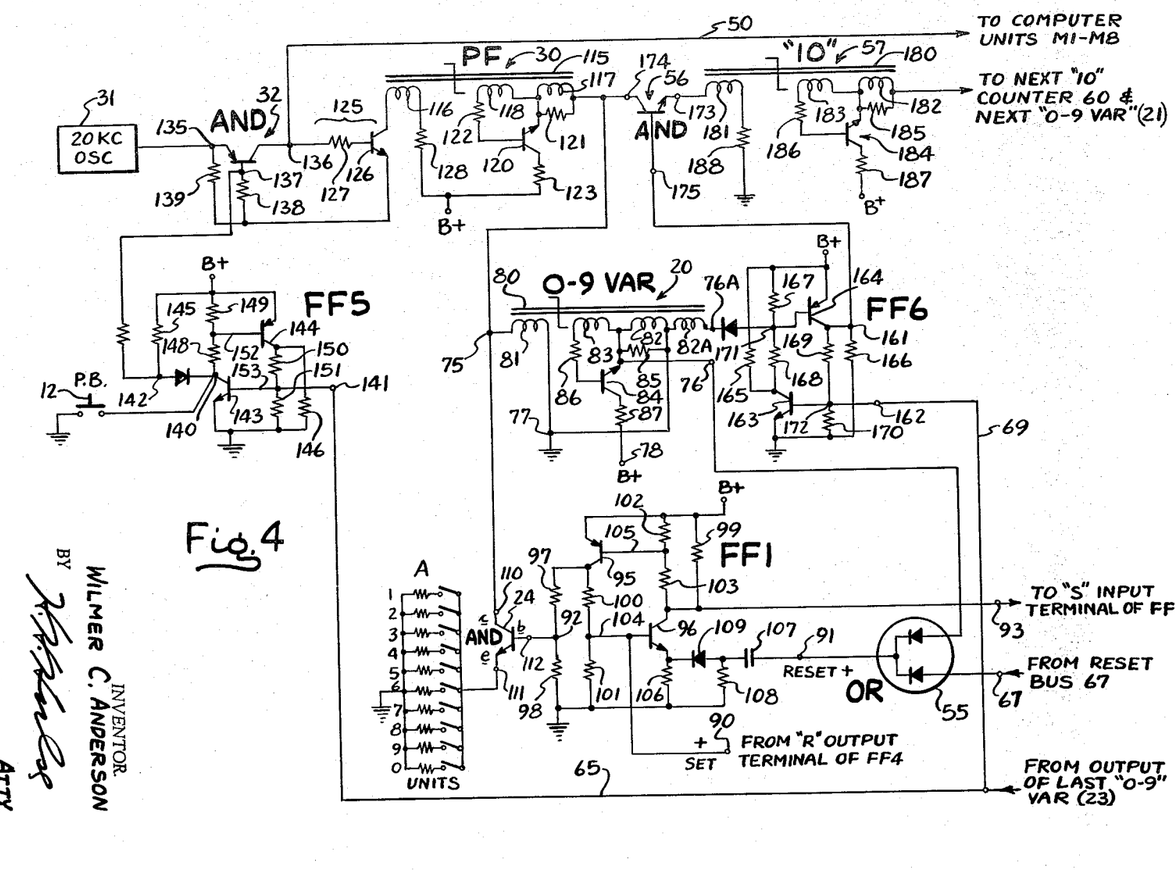
FIG. 4 is a circuit diagram for a portion of the input keyboard unit illustrated in FIGS. 1 and 3.

Since the stages of the keyboard unit 11 are the same, a detailed description will be given for one of the stages. Referring to FIG. 4, the unit stage or stage "A" of the keyboard unit 11 is illustrated in detail. In the present instance, the variable "0–9" counter 20 is of the type having an input terminal and an output terminal and including a saturable reactor which is advanced toward positive saturation step by step in accordance with the cumulative energy content of pulses received at the input terminal and which has provisions for resetting to the condition of negative saturation accompanied by the production of a pulse at the output terminal when positive saturation is exceeded. The total count required to drive the saturable reactor to positive saturation is controlled by a shunt resistor connected across the counter input terminals which diverts a predetermined portion of the energy of the input pulses to ground. The value of the shunt resistor is determined by closing one of the switches in the resistor-switch bank A so that the selected resistor shunts the counter input. The values of the resistors in the resistor-switch bank A are so related, that, when a high count is desired, for example nine, a low value shunt resistor is connected in the counter input so that most of the input energy is diverted to ground and nine input pulses are required to convert the counter from one condition of saturation to the other. Conversely, when a low count is desired, for example one, a high value shunt resistor is connected in the counter input so that a single input pulse suffices to drive the counter beyond the condition of positive saturation.

Magnetic counters suitable for use in the present circuit are commercially available under the name "Incremag" and are described in detail in U.S. Patent 2,897,380, issued July 28, 1959, to C. Neitzert to which reference is made for the details of construction and operation. Briefly stated the "0–9" counter 20 has an input terminal 75, output terminals 76 and 76A, and a ground terminal 77. Power is supplied to the counter through terminal 78 from a power supply designated as B+. The heart of the counter is a saturable reactor 80 having an input winding 81, an output-reset winding 82, an output winding 82A, and a triggering winding 83. A transistor 84 has its input circuit connected across the triggering winding and has as its output circuit connected in series with the output-reset winding 82A. The material of the core is so chosen that when an input pulse is applied to the input winding, the magnetization of the core is advanced one step from negative saturation toward the condition of positive saturation.

The number of pulses required for positive saturation depends upon the cumulative energy content of the input pulses which in turn depends upon the value of the shunt resistance connected across the counter input at terminal 75. When the device is set for a count of nine, the eighth pulse is effective to produce a condition of near saturation. The ninth pulse causes the knee of the saturation curve to be exceeded, and, when such pulse is removed, the sudden collapse of the excess flux in the saturable reactor 80 induces a voltage in the triggering winding 83 which is in a direction to initiate conduction in the transistor 84, causing a positive output to be produced at terminal 76. The resulting flow of current in the output-reset winding 82A not only drives the core 80 towards its opposite condition of saturation, but induces a voltage in the triggering winding 83 which causes still further current to flow through the transistor output circuit to the point where a condition of negative saturation is achieved in the core of the reactor. This restores the device to its initial state in readiness to receive a new series of pulses and induces a negative output pulse in output winding 82, which appears at terminal 76A. To prevent operation of the transistor 84 in response to the small changes in flux which occur during each step of advancement toward saturation, a damping resistor 85 is placed in parallel with the output-reset winding 82A. Moreover, to limit the base current of the transistor in the face of a large voltage induced in the triggering winding, a series resistor 86 is used. Finally, there is provided in series with the collector of the transistor 84 a low value resistor 87 for the purpose of limiting the reset current, which not only tends to protect the transistor, but which also limits the load which is placed upon the power supply B+.

The flip-flop FF1 includes a set input terminal 90, a reset input terminal 91, a set output terminal 92, and a reset output terminal 93. The set input terminal 90 is supplied from the reset output terminal of the flip-flop FF4. The reset input terminal 91 is supplied from the OR gate 55 which in turn is supplied from the output of the variable "0–9" counter 20 and from the reset bus 67 which is supplied by the output of the variable "0–9" counter 23. While the present invention is not limited to the use with any particular flip-flop circuit, the disclosed circuit possesses a number of advantages in this environment and hence is preferred. The flip-flop is of the type in which both legs of the circuit are simultaneously conductive when the circuit is "set" and simultaneously non-conductive when the circuit is "reset." Thus, there is provided in the left-hand leg of the circuit a transistor 95 and in the right-hand leg a transistor 96. These transistors are of the PNP and NPN types respectively, and should be of the type having extremely low leakage current. Connected in the output circuit of the transistor 95 is a load resistor consisting of two series sections 97 and 98, the junction of which is connected to the output terminal 92. The transistor 96 has a load resistor 99. For the purpose of cross-coupling the output circuit of the transistor 95 to the input circuit of the transistor 96, a voltage divider is provided consisting of a series connection of resistors 100 and 101. Similarly, for coupling the output of the transistor 96 to the input of the transistor 95, a voltage divider is provided made up of resistors 102 and 103. The cross connections are indicated at 104 and 105.

For the purpose of setting the flip-flop FF1, i.e., for rendering it conductive, the flip-flop FF4 is reset causing a positive signal to be transmitted from the reset output terminal of the flip-flop FF4 to the set input terminal 90 of the flip-flop FF1 which is connected to the base of the transistor 96. In response to the positive input signal, the transistor 96 begins to conduct. This produces a voltage at the cross connection 105 that is negative with respect to the emitter of the transistor 95 which causes conduction to begin in transistor 95. This in turn produces a positive-going voltage on the cross connection 104 augmenting conduction in the transistor 96. The effect of the cross connections is regenerative so that, once triggered by an input pulse at terminal 90, both legs of the flip-flop become instantly saturated producing a positive step change in voltage at the output terminals 92 and 93. Conversely, when a positive pulse is applied to the reset input terminal 91, this tends to block the flow of current in the transistor 96 since the emitter of the transistor 96 is connected to ground through a low value resistor 106, the decrease in current resulting in a positive-going voltage being developed at the cross connection 105 which reduces the flow of current in the transistor 95. This is reflected in a less positive voltage at the cross connection 104 causing a further reduction in the flow of current in the transistor 96. Again, the effect is regenerative so that conduction immediately ceases in both legs of the flip-flop circuit. To produce a positive reset pulse of a reliably high value, the positive pulse applied to the reset input terminal 91 is differentiated by a series capacitor 107 and resistor 108 and the resulting positive peak is selectively passed to the emitter of the transistor 96 by a series diode 109.

In carrying out the operation of the keyboard unit, the flip-flop FF1 controls an associated switch or gate 24 so that the resistor-switch bank A is connected to or disconnected from the input terminal 75 of the variable "0–9" counter 20. The gate 24 includes an input terminal 110, an output terminal 111, and a control terminal 112, with the control terminal being connected to the output terminal 92 of the flip-flop FF1. In the illustrated example the gate 24 is a transistor AND gate having its collector connected to the input terminal, its base connected to the control terminal and its emitter connected to the output terminal. It will be apparent that when the flip-flop FF1 is set or rendered conductive, a voltage will be applied to the base terminal of the transistor 24 which is sufficiently positive, the transistor being of the NPN variety, so that the transistor 24 is rendered conductive and the resistor-switch bank A is connected to the input terminal 75 of the variable "0–9" counter 20.

The pulse former 30 is also constructed in accordance with the teachings of the above-mentioned Neitzert patent and the circuit of the pulse former corresponds closely to the circuit of the above-described variable "0–9" counter 20. That is, there is provided a saturable reactor 115 having an input winding 116, an output winding 117, and a triggering winding 118. When saturation of the core is exceeded and the saturating input pulse is abruptly terminated, the voltage induced in the triggering winding 118 due to the sudden collapse of excess flux triggers a transistor 120 so that current flows through the output winding 117. Part of the current flowing through the output winding 117 flows through the input winding 81 of the variable "0–9" counter 20 and the rest of the current flows through the AND gate 24 and the resistor-switch bank A. The current from the output winding 117 flows through an input winding 181 of the "10" counter 57 if the AND gate 56 is opened and the AND gate 24 is closed. A damping resistor 121 is connected in parallel with the output winding 117, base current is limited by a series resistor 122, and current in the output circuit is limited by a series resistor 123. To improve the consistency of the input pulses applied to the pulse former 30, an input or buffer stage 125 is included in the pulse former which consists of a transistor 126 and an input resistor 127. The current flowing through the output circuit of the transistor 126 and through the input winding 116 of the pulse former 30, when the core is saturated, is limited by a series resistor 128. The transistor 126 is rendered conductive by the application of positive pulses to its base from the source of pulses 31. The pulse former 30 is so designed that the core 115 is saturated in response to each pulse from the source of pulses 31 and, therefore, an output pulse having a predetermined constant volt-second content is provided by the pulse former 30 when the transistor 120 is triggered in response to the termination of each pulse from the source of pulses 31.

For the purpose of receiving the input pulses from the source of pulses 31 and for gating the pulses to the pulse former 30, a switch or gate 32 is provided. That gate 32 has an input terminal 135, an output terminal 136, and a control terminal 137. The gate 32 is illustrated as being a transistor AND gate having a resistor 138 connected in series with the control terminal and having a resistor 139 connected across the input thereof which is a load resistor for the transistor 126 in the pulse former buffer stage 125. When the AND gate 32 is rendered conductive, the transistor 126 is rendered conductive and pulses are transmitted from the source of pulses 31 to the pulse former 30 and to the selected computer unit over conductor 50.

Operation of the AND gate 32 is controlled by the flip-flop FF5 which includes a set input terminal 140, a reset input terminal 141, and an output terminal 142. The set input terminal 140 is supplied by depressing the set push button 12 which applies ground thereto. The reset input terminal 141 is supplied over conductor 65 by the output pulse from the variable "0–9" counter 23 when the counter 23 is filled. Similar to transistor FF1, transistor FF5 is of the type in which both legs of the circuit are simultaneously conductive when the circuit is "set" and simultaneously nonconductive when the circuit is "reset." Thus, there is provided in the left-hand leg of the circuit a transistor 143 and in the right-hand leg a transistor 144. These transistors are of the NPN and PNP types respectively and should be of the type having extremely low leakage current. Connected in the output circuit of the transistor 143 is a load resistor 145. Connected in the output circuit of the transistor 144 is a load resistor 146. For the purpose of cross coupling the output circuit of the transistor 143 to the input circuit of the transistor 144, a voltage divider is provided consisting of the series connection of resistors 148 and 149. Similarly, for coupling the output of the transistor 144 to the input of the transistor 143, a voltage divider is provided made up of resistors 150 and 151. The cross connections are indicated at 152 and 153.

The operation of the flip-flop FF5 will be apparent to one skilled in the art and may be reviewed as follows. It will be assumed at the outset that the flip-flop is nonconductive. When the push button 12 is closed, ground is applied to terminal 140 causing current to flow from the source of positive potential B+ through the resistors 149 and 148 through terminal 140 and through the closed push button 12 to ground. This produces a voltage at cross connection 152 that is negative with respect to the emitter of the transistor 144 which causes conduction to begin in the transistor 144. This in turn produces a positive-going voltage on the cross connection 153 with respect to the emitter of the transistor 143 which causes conduction to begin in the transistor 143. Similar to the flip-flop FF1, the effect of the cross connections is regenerative, so that once triggered by an input pulse at terminal 140, both legs of the flip-flop become instantly saturated producing a negative step change in the voltage at the output terminal 142. Conversely, when a negative pulse is applied to the reset input terminal 141, cross connection 153 is driven negative with respect to the emitter of the transistor 143 and the transistor 143 is rendered nonconductive. This produces a voltage at the cross connection 152 which is positive-going and causes the transistor 144 to be rendered nonconductive. Again, the effect is regenerative so that conduction immediately ceases in both legs of the flip-flop. The negative signal provided at terminal 142, when the flip-flop FF5 is rendered conductive, is applied to the control terminal 137 of the AND gate 32 causing the AND gate 32 to be rendered conductive. Subsequently, when the flip-flop FF5 is rendered nonconductive, a positive signal is applied to terminal 142 which is transmitted to the control terminal of the AND gate 32 causing the AND gate 32 to be rendered nonconductive.

The output of the variable "0–9" counter 20 provided at terminal 76 is transmitted through the OR gate 55 to the reset input terminal 91 of the flip-flop FF1 causing the flip-flop FF1 to be reset and the output at terminal 76A is applied to the flip-flop FF6 causing flip-flop FF6 to be set. Tht flip-flop FF6 includes a set input terminal which is connected to the output terminal 76A of the counter 20, a set output terminal 161 which is connected to a control terminal 175 of the AND gate 56, and a reset input terminal 162 which is connected to the output of the variable "0–9" counter 23 through conductor 69. Similar to the flip-flop FF1, the flip-flop FF6 is the type in which both legs of the circuit are simultaneously conductive when the circuit is "set" and simultaneously nonconductive when the circuit is "reset." Thus, there is provided in the left-hand leg of the circuit a transistor 163 and in the right-hand leg a transistor 164. These are of the NPN and PNP types respectively and should be of the type having extremely low leakage current. Connected in the output circuit of the transistor 163 is a load resistor 165 and connected in the output circuit of the transistor 164 is a load resistor 166. For the purpose of cross coupling the output circuit of the transistor 163 to the input circuit of the transistor 164, a voltage divider is provided consisting of a series connection of resistors 167 and 168. Similarly, for coupling the output of the transistor 164 to the input of the transistor 163, a voltage divider is provided made up of resistors 169 and 170. The cross connections are indicated at 171 and 172.

The operation of the flip-flop FF6 will be apparent to one skilled in the art and may be reviewed as follows. It will be assumed at the outset that the flip-flop is nonconducting. A negative input pulse appearing at input terminal 76A causes the transistor 164 to begin to conduct. This produces a voltage at the cross connection 172 that is positive with respect to the emitter of the transistor 163 which causes conduction to begin in the transistor 163. This in turn produces a negative-going voltage on the cross connection 171 augmenting conduction in the transistor 164. The effect of the cross connections is regenerative so that once triggered by an input pulse at terminal 76A, both legs of the flip-flop become instantly saturated producing a positive step change in voltage at the output terminal 161. Conversely, when a negative pulse is applied to the reset input terminal 162, the transistor 163 is rendered nonconductive. This produces a positive voltage at the cross connection 171 which causes the transistor 164 to be rendered nonconductive. Again, the effect is regenerative so that conduction immediately ceases in both legs of the flip-flop circuit.

When a positive voltage is provided at the output terminal 161, it is transmitted to the control terminal 175 of the AND gate 56 causing the AND gate 56 to be rendered conductive. The AND gate 56 also has an input terminal 174 and an output terminal 173. The AND gate 56 is illustrated as a transistor having its collector connected to the input terminal, its base connected to the control terminal, and its emitter to the output terminal. It will be apparent that when a positive voltage is applied to the control terminal 175, the transistor is rendered conductive since it is of the NPN variety. As previously set forth, AND gate 56 controls the flow of output pulses from the pulse former 30 to the "10" counter 57.

The "10" counter 57 is also constructed in accordance with the teachings of the above-mentioned Neitzert patent and the circuit thereof corresponds closely to the circuit of the variable "0–9" counter 20. That is, there is provided a saturable reactor 180 having an input winding 181, an output winding 182, and a triggering winding 183. When saturation of the core is exceeded and the saturating input pulse is abruptly terminated, the voltage induced in the triggering winding 183 due to the sudden collapse of excess flux triggers a transistor 184 so that current flows through the output winding 182 to the next succeeding "10" counter 60 through AND gate 58 and to the next succeeding variable "0–9" counter 21. A damping resistor 185 is arranged in parallel with the output winding, base current is limited by a series resistor 186, and current in the output circuit is limited by a series resistor 187. The resistor 188 is provided to limit current flow through the input winding 181 when the core is saturated. The "10" counter 57 is so designed that ten output pulses from the pulse former 30 are required to saturate the core 180 and, therefore, an output pulse is provided by the "10" counter 57 only when ten output pulses have been provided by the pulse former 30.

The remaining stages of the keyboard unit are the same as stage "A" described hereinabove and, therefore, they will not be described in detail.

In accordance with the present invention, a first counter circuit is provided for counting the number of products produced in a manufacturing process or the like that have tolerances which exceed the upper limit of tolerance and for controlling the operation of a control device associated with the manufacturing process when a predetermined abnormal number of out-of-tolerance products have been counted. A second counter circuit is provided for counting the number of products produced in the manufacturing process that have tolerances which are below the lower limit of tolerance and for controlling the control device associated with the manufacturing process when a predetermined abnormal number of out-of-tolerance products have been counted. A reference counter circuit is provided for counting the total number of products produced in the manufacturing process and for resetting the first and second counter circuits to an initial condition if a predetermined number of products have been counted thereby without an abnormal number of out-of-tolerance products being indicated by an output from the first or second counter circuit.

Figure 5:
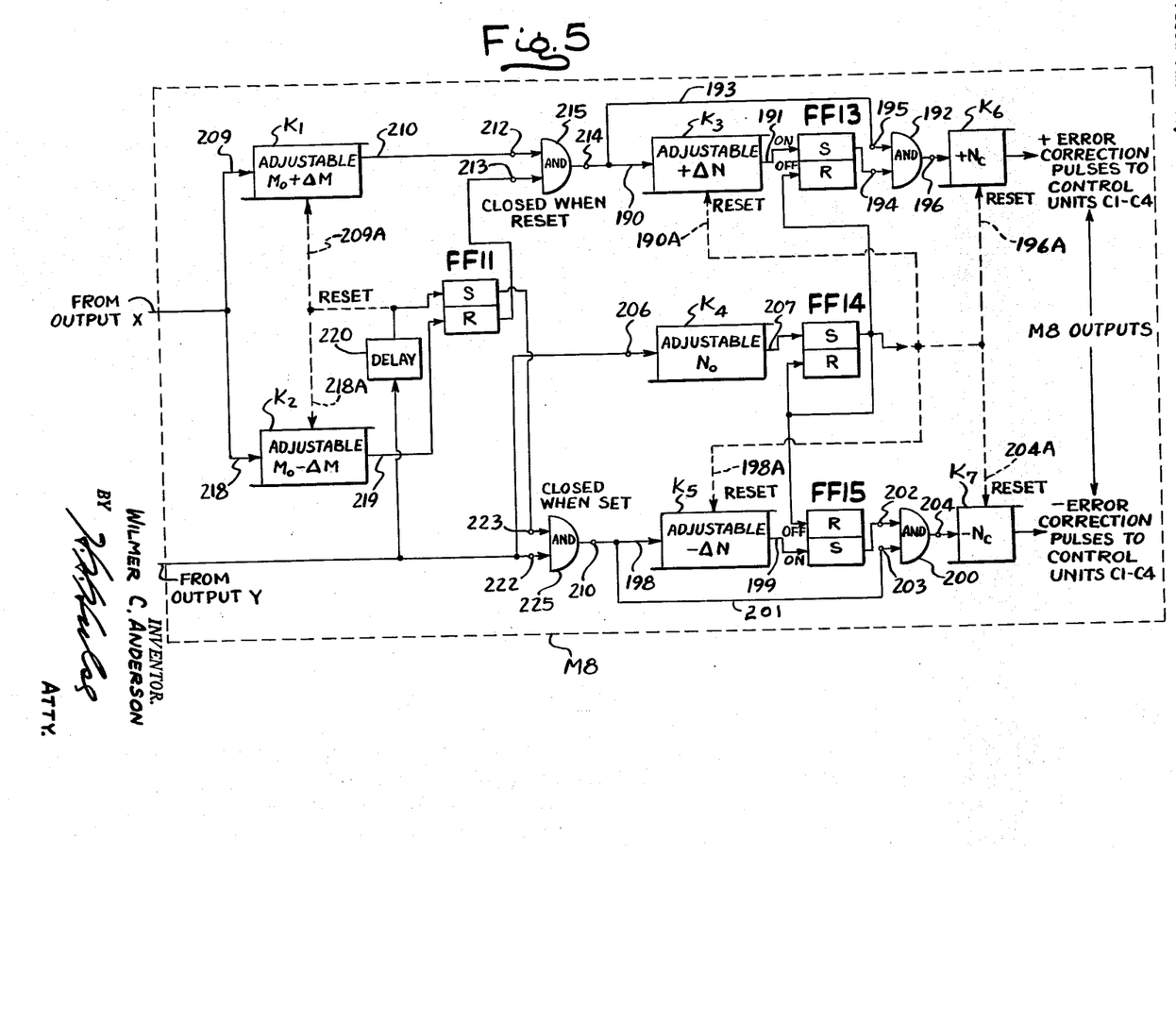
FIG. 5 is a more detailed block diagram of one of the computer units illustrated in FIGS. 1 and 3.

Referring to FIG. 5, one of the computer units M8 is illustrated. A first adjustable counter, designated as K3, having an input 190 and an output 191 is provided for receiving pulses representative of a product measurement which exceeds the upper allowable tolerance limit. Preferably, the counter K3 is a variable magnetic counter or a series of variable magnetic counters connected in tandem which is constructed in accordance with the above-mentioned Neitzart patent and is similar to the above-described variable "0–9" counter 20 described in the detailed description of the keyboard unit 11. When a predetermined number of pulses have been applied to the input of the counter K3, as determined by the presetting thereof, an output pulse is provided thereby which is transmitted to the "S" input terminal of a flip-flop FF13 causing the flip-flop to be driven to the set condition. When the flip-flop FF13 is set, an output signal is provided at the "S" output terminal and is transmitted therefrom to an AND gate 192 causing the AND gate 192 to be opened so that subsequent pulses applied to the input of the counter K3 bypass the counter K3 over conductor 193 and are transmitted through the AND gate 192 to an excess counter K6.

The counter K6 is also constructed in accordance with the Neitzert patent and provides an output pulse when filled which causes the control units C1–C4 (FIGS. 1 and 3) to operate in the counterclockwise direction. The AND gate 192 has a control terminal 194 to which the output pulses from the flip-flop FF13 are applied, an input terminal 195 to which the pulses transmitted in conductor 193 are applied and an output terminal 196 wherein pulses are transmitted from the AND gate 192 to the counter K6. The AND gate 192 is preferably a transistor AND gate similar to the AND gate 32 set forth above in the detailed description of the keyboard unit 11.

A second adjustable counter, designated as K5, having an input 198 and an output 199 is provided for receiving pulses representative of a product measurement which is below the lower allowable tolerance limit. The counter K5 is identical to the counter K3 and is therefore also preferably a variable magnetic counter or a series of variable magnetic counters connected in tandem which is constructed in accordance with the above-mentioned Neitzert patent. When a predetermined number of pulses have been applied to the input of the counter K5, as determined by the presetting thereof, an output pulse is provided thereby which is transmitted to the "S" input terminal of a flip-flop FF15 causing the flip-flop to be driven to the set condition. When the flip-flop FF15 is set, an output signal is provided at the "S" output terminal and is transmitted therefrom to an AND gate 200 causing the AND gate 200 to be opened so that subsequent pulses applied to the input of the counter K5 bypass the counter K5 over conductor 201 and are transmitted through the AND gate 200 to an excess counter K7.

The counter K7 is also constructed in accordance with the Neitzert patent and provides an output pulse when filled which causes the control units C1–C4 (FIGS. 1 and 3) to operate in the clockwise direction. The AND gate 200 has a control terminal 202 to which the output pulses from the flip-flop FF15 are applied, an input terminal 203 to which pulses transmitted in the bypass conductor 201 are applied and an output terminal 204 wherein pulses are transmitted from the AND gate 200 to the counter K7. The AND gate 200 is identical to the AND gate 192 and is therefore also preferably a transistor AND gate similar to the AND gate 32 set forth in the detailed description of the keyboard unit 11.

An adjustable reference counter, designated as K4, having an input 206 and an output 207 is provided for counting the total number of products measured. The counter K4 is also preferably a variable magnetic counter or a series of variable magnetic counters connected in tandem which is constructed in accordance with the Neitzert patent. When a predetermined number of pulses representative of the number of products measured have been applied to the input of the counter K4, as determined by the presetting thereof, an output pulse is provided thereby which is applied to the "S" input terminal of a flip-flop FF14 causing the flip-flop to be driven to the set condition. When the flip-flop FF14 is set, an output signal is provided at the "S" output terminal and is transmitted therefrom (1) to "R" input terminals of the flip-flops FF13–FF15 causing the flip-flops to be reset and (2) to reset input terminals 190A, 198A, 196A and 204A of the counters K3, K5, K6 and K7 causing the counters to be reset to their initial conditions. The input 206 of the counter K4 is connected directly to output Y of the keyboard unit 11 and, therefore, counter K4 counts the number of reference pulses provided at the completion of transmitting trains of pulses to output X of the keyboard unit 11 which trains of pulses are representative of the values entered on the keyboard unit 11, the reference pulses counted being indicative of the number of products measured.

A pair of monitoring circuits are connected to output X of the keyboard unit 11 for controlling the transmission of input pulses to the counters K3 and K5. The first monitoring circuit includes an adjustable counter, designated as K1, having an input 209 and an output 210 which is provided for receiving the trains of pulses applied to output X since the input thereof is connected directly to output X. The counter K1 is similar to the counters K3–K5 and is also constructed in accordance with the above-mentioned Neitzert patent. When a predetermined number of pulses have been applied to the input of the coutner K1, an output pulse is provided at the output thereof. The counter K1 is preset to provide an output pulse, when a train of pulses including pulses equal in number to the value of the upper allowable tolerances, is applied thereto. The output 210 of the counter K1 is connected to an input terminal 212 of an AND gate 215 which also has a control terminal 213 and an output terminal 214 that is conencted to the input of the counter K3. The AND gate 215 is also similar to the AND gate 32 set forth in the detailed description of the keyboard unit 11. Output pulses from the counter K1 are transmitted through the AND gate 215 to the counter K3 when the AND gate 215 is opened.

The second monitoring circuit includes an adjustable counter, designated as K2, having an input 218 and an output 219 which is also provided for receiving the trains of pulses applied to output X since the input thereof is also connected directly to output X. Counter K2 is identical to the counter K1. An output pulse is provided by the counter K2 when a train of pulses including pulses equal in number to the value of the lower allowable tolerance limit is applied thereto. The output of the counter K2 is connected to the "R" input terminal of a flip-flop FF11 and output pulses from the counter K2 are transmitted to the "R" input terminal of the flip-flop FF11 to cause resetting thereof. When the flip-flop FF11 is reset, an output signal is provided at the "R" output terminal and is transmitted to the control terminal 213 of the AND gate 215 causing the AND gate 215 to be opened so that subsequent output pulses from the counter K1 may be transmitted through the AND gate 215 to the counter K3.

Output Y of the keyboard unit 11, which is directly connected to the input 206 of the counter K4 previously set forth, is connected through a delay circuit 220 to the "S" input terminal of the flip-flop FF11 so that the flip-flop is driven to the set condition when a reference pulse is provided at output Y. The delay circuit 220 is provided to delay the setting of the flip-flop FF11 by a reference pulse until time has been permitted for an output pulse from the counter K1 to pass through the AND gate 215 in case the reference pulse and the output pulse of the counter K1 are simultaneously provided. Output Y also is connected through the delay circuit 220 to reset input terminals 209A and 218A of the counters K1 and K2 so that the counters K1 and K2 are reset when a reference pulse is provided at output Y. Additionally, output Y is connected to an input terminal 222 of an AND gate 225 which also has a control terminal 223 and an output terminal 224 that is connected to the input of the counter K5, and AND gate 225 is identical to the AND gate 215. Reference pulses provided at output Y are transmitted through the AND gate 225 to the adjustable counter K5 when the AND gate 225 is opened. The "S" output terminal of the flip-flop FF11 is connected to the control terminal 223 of the AND gate 225 so that the AND gate 225 is opened when the flip-flop FF11 is driven to the set condition by an output pulse at output Y.

It should be noted that, when the flip-flop FF11 is set, AND gate 225 is opened and AND gate 215 is closed and, when the flip-flop FF11 is reset, AND gate 215 is opened and AND gate 225 is closed.

The computer unit M8 operates as follows. Assume that flip-flop FF11 is in the set condition which is the condition attained in response to a reference pulse at output Y which would have been provided during the next previous operation of the deviation control system 10. A train of output pulses provided by the keyboard unit 11 at the output X are transmitted to the counters K1 and K2 which provide output pulses when filled, the counter K2 being preset to be filled when a train of pulses including pulses equal in number to the lower allowable tolerance limit has been transmitted thereto and the counter K1 being preset to be filled when a train of pulses including pulses equal in number to the upper allowable tolerance limit has been transmitted thereto.

An output pulse provided by the counter K2 is transmitted to the "R" input terminal of the flip-flop FF11 causing the flip-flop FF11 to be reset so that the AND gate 215 is opened in response to the transmission thereto to an output signal from the "R" output terminal of the flip-flop FF11 and the AND gate 225 is closed. Subsequently, when an output pulse is provided by the counter K1, it is transmitted through the AND gate 215 to the counter K3. If a preset number of output pulses are applied to the counter K3, it is filled causing an output pulse to be transmitted to the "S" input terminal of the flip-flop FF13 so that the flip-flop FF13 is set and an output pulse is transmitted from the "S" output terminal to the AND gate 192 causing the AND gate 192 to be opened. Subsequently, pulses from the counter K1 passing through the AND gate 215 bypass the counter K3 in conductor 193 and are transmitted through the AND gate 192 to the counter K6. When the counter K6 is filled, an output pulse is provided thereby which causes the control units C1–C4 (FIGS. 1 and 3) to be operated in the counterclockwise direction.

A reference pulse is provided at output Y of the keyboard unit 11 at the completion of the transmission of the train of pulses to output X and the reference pulse is transmitted through the AND gate 225 to the counter K5 if an output pulse has not previously been provided by the counter K2 causing the flip-flop FF11 to be reset. If a preset number of output pulses are applied to the counter K5, it is filled causing an output pulse to be transmitted to the "S" input terminal of the flip-flop FF15 so that the flip-flop FF15 is set and an output pulse is transmitted from the "S" output terminal to the AND gate 200 causing the AND gate 200 to be opened. Subsequently, pulses received at output Y which pass through the AND gate 225 bypass the counter K5 in the conductor 201 and are transmitted through the AND gate 200 to the counter K7. When the counter K7 is filled, an output pulse is provided thereby which causes the control units C1–C4 (FIGS. 1 and 3) to be operated in the clockwise direction.

The reference pulse is also transmitted to the reference counter K4. When a predetermined number of reference pulses have been transmitted to the counter K4, which indicates that a desired number of products have been measured, the counter K4 is filled and an output pulse is provided thereby which is transmitted to the "S" input terminal of the flip-flop FF14 causing the flip-flop FF14 to be set. When the flip-flop FF14 is set, an output pulse is provided at the "S" output terminal thereof which is transmitted to the "R" input terminal of the flip-flops FF13–FF15 causing resetting thereof and which is transmitted to the reset terminals 190A, 198A, 196A and 204A of the counters K3, K5, K6 and K7 causing resetting thereof to initial conditions. If the reference counter K4 is filled before either of the counters K6 and K7 is filled, the entire computer unit M8 is reset to an initial condition and the control units C1–C4 are not operated.

Additionally, the reference pulse provided at output Y is transmitted through the delay circuit 220 to the "S" input terminal of the flip-flop FF11 causing the flip-flop FF11 to be set so that the AND gate 215 is closed and the AND gate 225 is opened. The reference pulse transmitted through the delay circuit 220 is also transmitted to the reset terminals 209A and 218A of the counters K1 and K2 causing the counters K1 and K2 to be reset to initial conditions. Thus, in response to the reference pulse, the monitoring circuits of the computer unit M8 are conditioned for a subsequent application of a train of input pulses to output X.

Therefore, in general, the computer unit M8 operates as follows. If a reference pulse is provided at output Y before the counter K2 is filled, a pulse, indicating that the value of the product measurement is below the lower tolerance limit, is transmitted to the counter K5 or the counter K7. If a reference pulse is provided at output Y after the counter K2 is filled and before the counter K1 is filled, no pulse, indicating that the value of the product measurement falls within the acceptable tolerance limits, is applied to the counters K3, K5, K6 and K7. If a reference pulse is provided after the counter K1 is filled, a pulse, indicating that the value of the product measurement is above the upper tolerance limit, is transmitted to the counter K3 or the counter K6. When the counter K6 or the counter K7 is filled before the counter K4 is filled, the control units C1–C4 are operated and, when the counter K4 is filled before the counter K6 and the counter K7 are filled, the comuter unit M8 is reset to an initial condition.

The counters in the computer unit M8 are preset by adjusting knobs 230 and 231 (see FIG. 1) which varies the values of shunting resistors associated with the inputs of the variable counters.

The construction and operation of the computer units M1–M7 are identical to the construction and operation of the computer unit M8 and, therefore, the construction and operation of the computer units M1–M7 will not be described in detail.

Thus, it may be seen that a deviation control system has been provided for detecting out-of-tolerance products produced in a manufacturing process or the like and for making a corrective change in the process parameters when an abnormal number of out-of-tolerance products have been detected. As will be obvious to one having ordinary skill in the art, the above-described deviation control system may be adapted for controlling a single variable in a manufacturing process or it may be adapted for controlling a plurality of variables in a manufacturing process. Since the desired values may be accurately preset in the counters of the computer unit, the accuracy of the deviation control unit may be controlled to approximately 0.1%.

I claim as my invention:

1. A deviation control system for controlling a variable in a manufacturing process or the like to minimize the number of out-of-tolerance final products produced by such process, which comprises, a first adjustable counter for counting the number of final products having tolerances which exceed the upper limit of tolerance and for producing an output signal when the counter is full, a second adjustable counter for counting the number of final products having tolerances which are below the lower limit of tolerance and for producing an output signal when the counter is full, an adjustable reference counter for counting the total number of final products and for producing an output signal when the counter is full, a control device associated with the manufacturing process, means for adjusting the control device in one direction when the first adjustable counter is the first to be filled and for adjusting the control device in the opposite when the second adjustable counter is the first to be filled, and means for resetting all the counters to an initial condition when the reference counter is the first to be filled.

2. A deviation control system for controlling a plurality of variables in a manufacturing process or the like to minimize the number of out-of-tolerance final products produced by such process, which comprises, a plurality of control circuits, each of the control circuits including (1) a first adjustable counter for counting the number of final products having tolerances which exceed the upper limit of tolerance and for producing an output signal when the counter is full, (2) a second adjustable counter for counting the number of final products having tolerances which are below the lower limit of tolerance and for producing an output signal when the counter is full, and (3) an adjustable reference counter for counting the total number of final products and for producing an output signal when the counter is full, a plurality of control devices associated with the manufacturing process and respectively connected to the plurality of control circuits, means associated with each control circuit for adjusting the associated control device in one direction when the first adjustable counter of the control circuit is the first to be filled and for adjusting the associated control device in the opposite direction when the second adjustable counter of the control circuit is the first to be filled, means associated with each control circuit for resetting all the counters thereof to an initial condition when the adjustable reference counter included therein is the first to be filled, and means for selectively activating the plurality of control circuits.

3. A deviation control system for controlling a variable in a manufacturing process or the like to minimize the number of out-of-tolerance final products produced by such process, which comprises, means, including a keyboard upon which a measurement of a given final product may be entered, for providing a digital signal representative of the measurement, a first monitoring circuit for receiving the digital signal and for producing an output pulse when the digital signal represents a measurement having a value which exceeds a prescribed upper limit of tolerance, a second monitoring circuit for receiving the digital signal and for producing an output pulse when the digital signal represents a measurement having a value which is below a prescribed lower limit of tolerance, a first adjustable counter for counting the number of output pulses from the first monitoring circuit and for producing an output pulse when the counter is full, a second adjustable counter for counting the number of output pulses from the second monitoring circuit and for producing an output signal when the counter is full, a control device associated with the manufacturing process, means for adjusting the control device in one direction when the first adjustable counter is the first to be filled and for adjusting the control device in the opposite direction when the second adjustable counter is the first to be filled, and an adjustable reference counter for counting the total number of final products and for producing an output signal when the counter is filled which resets the first and second adjustable counters to initial conditions, the adjustable reference counter automatically resetting itself when it is filled.

4. A deviation control system for controlling a variable in a manufacturing process or the like to minimize the number of out-of-tolerance final products produced by such process, which comprises, a first adjustable counter for counting a predetermined number of final products having tolerances which exceed the upper limit of tolerance and for producing an output signal when the predetermined number of final products have been counted, a second adjustable counter for counting a predetermined number of final products having tolerances which are below the lower limit of tolerance and for producing an output signal when the predeterminad number of final products have been counted, an adjustable reference counter for counting the total number of final products and for producing an output signal when the counter is full, means, including a first excess counter, connected to the first adjustable counter and rendered operative in response to the output signal produced by the first adjustable counter for counting the number of subsequent final products having tolerances which exceed the upper limit of tolerance, the first excess counter producing an output signal when filled, means, including a second excess counter, connected to the second adjustable counter and rendered operative in response to the output signal produced by the second adjustable counter for counting the number of subsequent final products having tolerances which are below the lower limit of tolerance, the second excess counter producing an output signal when filled, a control device associated with the manufacturing process, means for adjusting the control device in one direction when the first excess counter is the first to be filled and for adjusting the control device in the opposite direction when the second excess counter is the first to be filled, and means for resetting all the counters to an initial condition when the reference counter is the first to be filled.

5. A deviation control system for controlling a variable in a manufacturing process or the like to minimize the number of out-of-tolerance final products produced by such process, which comprises, means, including a keyboard upon which a measurement of a given final product may be entered, for providing a digital signal representative of the measurement, a first monitoring circuit for receiving the digital signal and for producing an output pulse when the digital signal represents a measurement having a value which exceeds a prescribed upper limit of tolerance, a second monitoring circuit for receiving a digital signal and for producing an output pulse when the digital signal represents a measurement having a value which is below a prescribed lower limit of tolerance, a first adjustable counter for counting a predetermined number of output pulses from the first monitoring circuit and for producing an output signal when the predetermined number of output pulses have been counted, a second adjustable counter for counting a predetermined number of output pulses from the second monitoring circuit and for producing an output signal when the predetermined number of output pulses have been counted, an adjustable reference counter for counting the total number of final products and for producing an output signal when the counter is full, means, including a first excess counter, connected to the first adjustable counter and rendered operative in response to the output signal produced by the first adjustable counter for counting the number of subsequent output pulses produced by the first monitoring circuit, the first excess counter producing an output signal when filled, means, including a second excess counter, connected to the second adjustable counter and rendered operative in response to the output signal produced by the second adjustable counter for counting the number of subsequent output pulses produced by the second monitoring circuit, the second excess counter producing an output signal when filled, a control device associated with the manufacturing process, means for adjusting the control device in one direction when the first excess counter is the first to be filled and for adjusting the control device in the opposite direction when the second excess counter is the first to be filled, and means for resetting all the counters to an initial condition when the reference counter is the first to be filled.

6. A deviation control system for controlling a variable in a manufacturing process or the like to minimize the number of out-of-tolerance final products produced by such process, which comprises, means, including a keyboard upon which a measurement of a given final product may be entered, for providing a sequence of output pulses corresponding to the value of the measurement and for providing a control pulse when all the corresponding, sequential output pulses have been provided, a first monitoring circuit, including an adjustable magnetic counter, for receiving the sequence of output pulses and for providing an output pulse when the counter is full which indicates that the value of the measurement exceeds a prescribed upper limit of tolerance, a second monitoring circuit, including an adjustable magnetic counter, for receiving the sequence of output pulses and for providing an output pulse when the counter is full which indicates that the value of the measurement is above a prescribed lower limit of tolerance, a first adjustable magnetic counter for counting the number of output pulses from the first monitoring circuit and for producing an output pulse when the counter is full, a second adjustable magnetic counter rendered inoperative by output pulses from the second monitoring circuit for counting the number of control pulses provided before an output pulses is provided by the second monitoring circuit and for producing an output pulse when the conuter is full, a control device associated with the manufacturing process, means for adjusting the control device in one direction when the first adjustable magnetic counter is the first to be filled and for adjusting the control device in the opposite direction when the second adjustable magnetic counter is the first to be filled, and an adjustable magnetic reference counter for counting the total number of control pulses and for producing an output signal when the counter is filled which resets all the counters to initial conditions.

References Cited by the Examiner
UNITED STATES PATENTS

| | | | |
|---|---|---|---|
| 2,721,701 | 10/1955 | Hardesty et al. | 235—92 |
| 2,768,784 | 10/1956 | Gordon et al. | 235—168 |
| 2,897,638 | 7/1959 | Maker | 235—92 |
| 3,151,237 | 9/1964 | Hrabak | 235—92 |

DARYL W. COOK, *Acting Primary Examiner.*

JOHN F. MILLER, *Examiner.*